(12) United States Patent
Barenbrug et al.

(10) Patent No.: US 8,515,134 B2
(45) Date of Patent: Aug. 20, 2013

(54) SYSTEM AND METHOD FOR MOTION ESTIMATION USING IMAGE DEPTH INFORMATION

(75) Inventors: Bart Barenbrug, Waalre (NL); Robert Paul Berretty, Leenderstrijp (NL); Claus Nico Cordes, Eindhoven (NL); Rene Klein Gunnewiek, Utrecht (NL); Jose Pedro Magalhaes, Eindhoven (NL); Ling Shao, Sheffield (GB)

(73) Assignee: NXP B.V., Eindhoven (NL)

( * ) Notice: Subject to any disclaimer, the term of this patent is extended or adjusted under 35 U.S.C. 154(b) by 889 days.

(21) Appl. No.: 12/636,555

(22) Filed: Dec. 11, 2009

(65) Prior Publication Data

US 2011/0142289 A1  Jun. 16, 2011

(51) Int. Cl.
*G06K 9/00* (2006.01)
(52) U.S. Cl.
USPC .......................................... 382/107; 382/154
(58) Field of Classification Search
USPC ............. 382/236, 100, 107, 154; 375/240.16
See application file for complete search history.

(56) References Cited

U.S. PATENT DOCUMENTS

| | | | | |
|---|---|---|---|---|
| 5,943,445 A * | 8/1999 | Dufaux | .......................... | 382/236 |
| 6,847,728 B2 * | 1/2005 | Tao et al. | ....................... | 382/106 |
| 7,990,389 B2 * | 8/2011 | Barone | .......................... | 345/475 |
| 8,054,335 B2 * | 11/2011 | Deng et al. | .................. | 348/208.1 |
| 8,260,567 B1 * | 9/2012 | Kaplan | ........................... | 702/142 |

OTHER PUBLICATIONS

Sawhney et al., "Model-Based 2D&3D Dominant Motion Estimation for Mosaicing and Video Representation," IEEE Int. Conf. On computer vision, Jun. 1995.*
Gerard De Haan, Paul W.A.C. Biezen, Henk Huijgen, Olukayode A. Ojo; True-Motion Estimation with 3-D Recursive Search Block Matching; IEEE Transactions on Circuits and Systems for Video Technology; Oct. 1993; vol. 3, No. 5; p. 1-12.
J. MacQueen; Some Methods for Classification and Analysis of Multivariate Observations; Western Management Science institute; p. 1-17.

* cited by examiner

*Primary Examiner* — Shefali Goradia

(57) ABSTRACT

A system and method for motion estimation involves obtaining input image frames, where the input image frames correspond to different instances in time, and performing motion estimation on the input image frames using depth information from the input image frames, where the depth information from an input image frame indicates how far a pixel in the input image frame is located from a surface of a three dimensional space.

22 Claims, 14 Drawing Sheets

SYSTEM AND METHOD FOR MOTION ESTIMATION USING IMAGE DEPTH INFORMATION

Embodiments of the invention relate generally to video processing systems and methods and, more particularly, to a system and method for motion estimation using image depth information.

Motion estimation (ME) is used to estimate object motion within image frames and is the basis for other video processing functions such as frame rate up-conversion and object segmentation. Current motion estimation techniques can suffer from occlusion area problem, which involves a foreground object moving within the image frames such that the foreground object gradually occludes image areas in a new position and at the same time de-occludes image areas from an old position. Thus, there is a need for a system and method for motion estimation that can improve the quality of the motion estimation while an occlusion area is present in input image frames.

A system and method for motion estimation involves obtaining input image frames, where the input image frames correspond to different instances in time, and performing motion estimation on the input image frames using depth information from the input image frames, where the depth information from an input image frame indicates how far a pixel in the input image frame is located from a surface of a three dimensional space. By exploiting the depth information from the input image frames, the system and method for motion estimation can improve the motion estimation quality while the occlusion area is present in the input image frames.

In an embodiment, a method for motion estimation involves obtaining input image frames, where the input image frames correspond to different instances in time, and performing motion estimation on the input image frames using depth information from the input image frames, where the depth information from an input image frame indicates how far a pixel in the input image frame is located from a surface of a three dimensional space.

In an embodiment, a method for motion estimation involves obtaining input image frames, where the input image frames correspond to different instances in time, and performing motion estimation on the input image frames using depth information from the input image frames, where the depth information from an input image frame indicates how far a pixel in the input image frame is located from a surface of a three dimensional space, where the depth information from the input image frame includes depth values, where each image pixel in the input image frame has one depth value or a group of image pixels in the input image frame has one depth value. Performing the motion estimation involves generating a motion vector for a group of image pixels in the input image frame, obtaining a corresponding group of image pixels in another input image frame of the input image frames using the motion vector, and calculating a match error between the group of image pixels in the input image frame and the corresponding group of image pixels in the another input image frame using the depth information from the input image frame and the another input image frame.

In an embodiment, a system for motion estimation includes an input image obtainer and a motion estimator. The input image obtainer is configured to obtain input image frames, where the input image frames correspond to different instances in time. The motion estimator is configured to perform motion estimation on the input image frames using depth information from the input image frames, where the depth information from an input image frame indicates how far a pixel in the input image frame is located from a surface of a three dimensional space.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

Figure 1A:
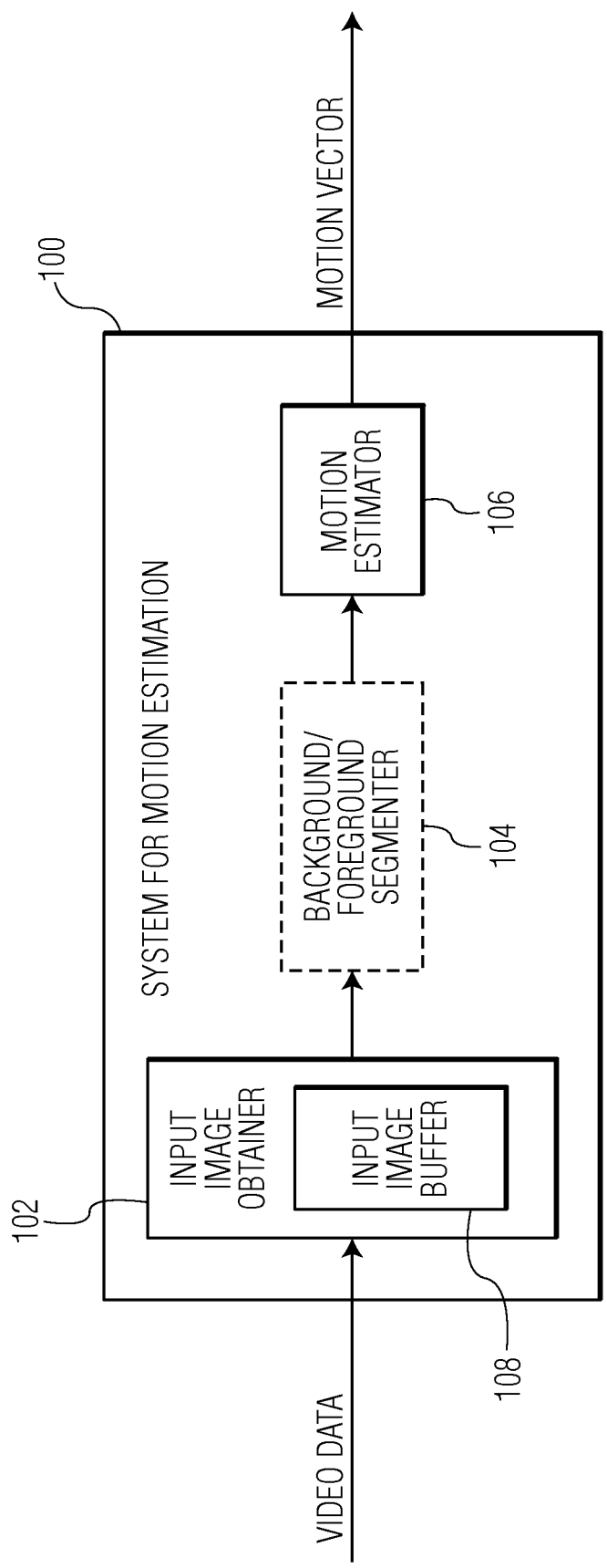
FIG. 1A is a schematic block diagram of a system for motion estimation in accordance with an embodiment of the invention.

FIG. 1A is a schematic block diagram of a system 100 for motion estimation in accordance with an embodiment of the invention. As shown in FIG. 1A, the system for motion estimation includes an input image obtainer 102, an optional background/foreground segmenter 104, and a motion estimator 106. Although the background/foreground segmenter is shown in FIG. 1A as being separate from the input image obtainer and the motion estimator, the background/foreground segmenter may be integrated with the input image obtainer or the motion estimator in other embodiments. The system for motion estimation can be implemented in, for example, video processing servers and televisions. The result of the system for motion estimation may be supplied to other video processing functional elements for operations such as frame rate up-conversion and object segmentation. For example, the system for motion estimation generates at least one motion vector and a motion compensated temporal interpolator (not shown) performs motion compensated temporal interpolation on input image frames using the motion vector.

In the embodiment of FIG. 1A, the input image obtainer 102 is configured to obtain input image frames, where the input image frames correspond to different instances in time. As shown in FIG. 1A, the input image obtainer includes an input image buffer 108 to buffer video data and to reconstruct input image frames from received video data. However, the input image obtainer may not include the input image buffer in other embodiments.

The optional background/foreground segmenter 104 is configured to perform segmentation of a background and a foreground of an input image frame using depth information from the input image frame. In other words, the background/foreground segmenter identifies whether a single image pixel or an image object that includes multiple image pixels is located in a foreground of a three dimensional space or located in a background of the three dimensional space. For example, the background/foreground segmenter performs segmentation of at least one background object and at least one foreground object of the input image frame using the depth information from the input image frame. In an embodiment, the background/foreground segmenter calculates a depth value change between a current depth value of an image pixel in the input image frame and a previous depth value of the image pixel in the input image frame and determines the image pixel as a background image pixel or as a foreground image pixel using the depth value change. Although the background/foreground segmenter is shown in FIG. 1A as being part of the system 100 for motion estimation, the background/foreground segmenter may not be part of the system for motion estimation in other embodiments.

An exemplary operation of the background/foreground segmenter 104 is described by a pseudo code excerpt as follows.

```
depth_jump = depth [x][y] - last_depth ;
if ( abs ( depth_jump ) > DEPTH_THRESHOLD) {
if ( depth_jump > 0)
{
on_occ_area = true ;
bg_mask [x][y] = BACKGROUND;
}
else
{
on_occ_area = false ;
bg_mask [x][y] = FOREGROUND;
}
} else {
bg_mask [x][y] = ( on_occ_area ?BACKGROUND: FOREGROUND);
}
```

In the exemplary operation described in the pseudo code excerpt, the background/foreground segmenter 104 performs segmentation of a background and a foreground of an input image frame in a three dimensional space through the computation of a mask for each image pixel in the input image frame. Specifically, the input image frame is scanned horizontally, one image pixel a step. At each step, a depth change value "depth_jump" is calculated through subtracting a previous depth value of an image pixel from a current depth value of the image pixel. In case there is a considerable depth change between the previous depth value and the current depth value, the image pixel is marked as a background image pixel or as a foreground image pixel. When the absolute value of the depth change value "depth_jump" is bigger than a threshold value "DEPTH_THRESHOLD," the image pixel is marked as a background image pixel or as a foreground image pixel and whether or not the image pixel is in an occlusion area is determined. Specifically, when the absolute value of the depth change value "depth_jump" is bigger than the threshold value "DEPTH_THRESHOLD" and the depth change value "depth_jump" is bigger than zero, the image pixel is marked as a background image pixel and is determined to be in an occlusion area. When the absolute value of the depth change value "depth_jump" is bigger than the threshold value "DEPTH_THRESHOLD" and the depth change value "depth_jump" is equal to or smaller than zero, the image pixel is marked as a foreground image pixel and is determined to be in a non-occlusion area. When the absolute value of the depth change value "depth_jump" is equal to or smaller than the threshold value "DEPTH_THRESHOLD," the image pixel is marked as a background image pixel or as a foreground image pixel based on whether the image pixel is in an occlusion area. Alternatively, the background/foreground segmenter may use a k-means clustering algorithm as described in J. MacQueen, "Some Methods for Classication and Analysis of Multivariate Observations," in Proceedings of the Fifth Berkeley Symposium on Mathematical Statistics and Probability, 1(281-297):14, 1967 before the mask calculation.

The motion estimator 106 is configured to perform motion estimation on input image frames using depth information from the input image frames, where the depth information from an input image frame indicates how far a pixel in the input image frame is located from a surface of a three dimensional space. The depth information from the input image frame may include depth values that correspond to two objects in the input image frame, and the depth values indicate which one of the two objects is located in the foreground of the three dimensional space and which one of the two objects is located in the background of the three dimensional space. The depth values may be calculated, recorded, and transmitted individually for every image pixel in an input image frame. As a result, each image pixel in the input image frame has one depth value. Alternatively, the depth values may be calculated, recorded, and transmitted jointly for a group of image pixels in the image frame. As a result, a group of image pixels in the input image frame, for example, a macro block of image pixels, has one depth value. In an embodiment, every group of image pixels such as every block of 8×8 image pixels in the input image frame has only one depth value. The motion estimator may perform motion estimation on two input image frames or more than two input image frames. In an embodiment, the motion estimator performs motion estimation on two input image frames to generate at least one motion vector. For example, the motion estimator performs motion estimation on a previous image frame and a current image frame to generate the motion vector. In another embodiment, the motion estimator performs motion estimation on more than two input image frames to generate at least one motion vector. For example, the motion estimator performs motion estimation on a previous image frame, a current image frame, and a next image frame to generate the motion vector. In another example, the motion estimator performs motion estimation on a pre-previous image frame, a previous image frame, and a current image frame to generate the motion vector.

Figure 1B:
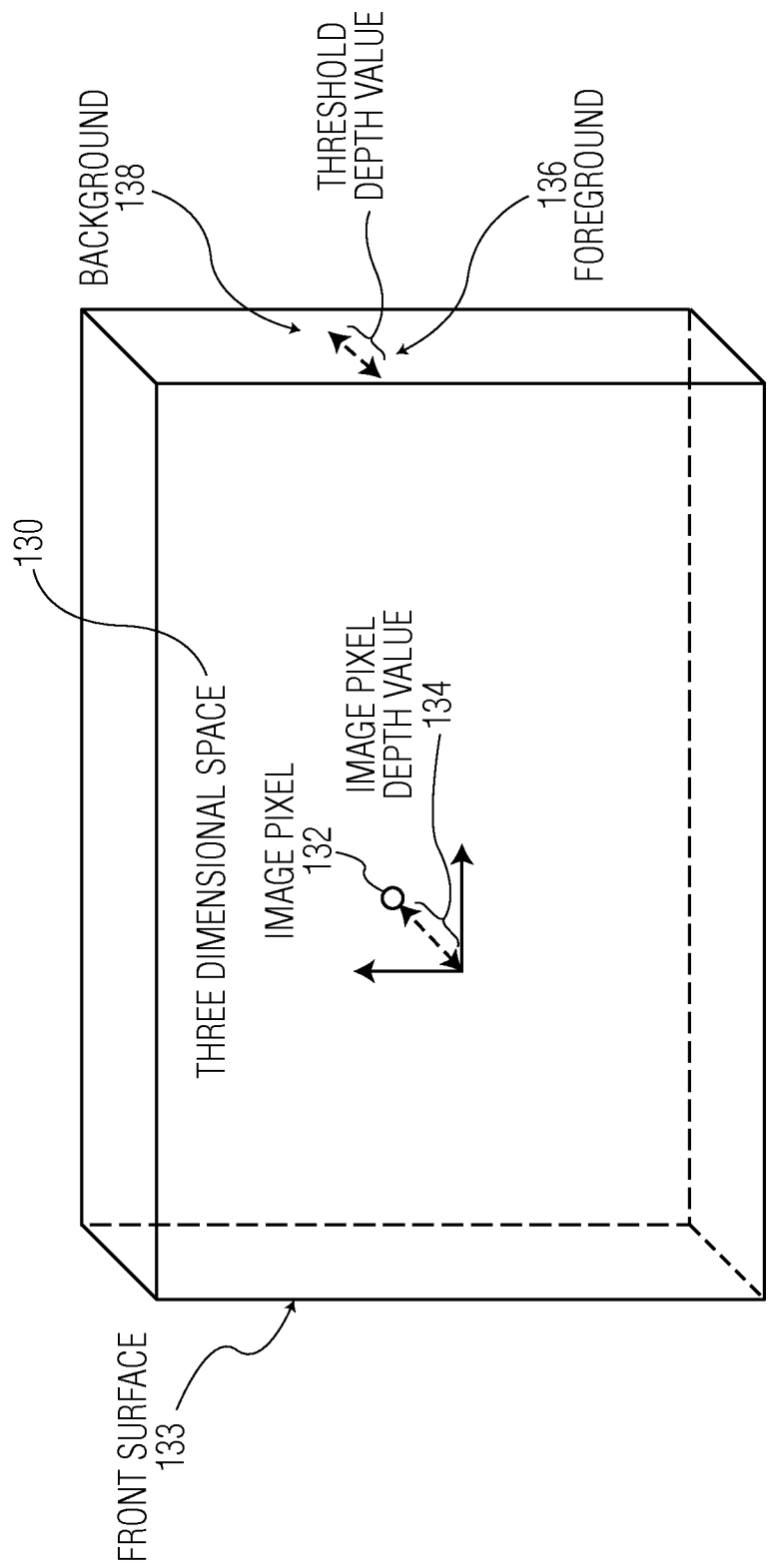
FIG. 1B illustrates an image pixel depth value in a three dimensional space.

FIG. 1B illustrates an image pixel depth value in a three dimensional space 130. As shown in FIG. 1B, an image pixel 132 of an input image frame is located in the three dimensional space. The three dimensional space has a front surface 133. In the embodiment of FIG. 1B, the depth value 134 of the image pixel is the distance between the surface of the three dimensional space and the image pixel. Although the surface in FIG. 1B is a front surface of the three dimensional space, the surface may be a back surface or other surface of the three dimensional space in other embodiments. The three dimensional space can be divided into a foreground 136 and a background 138 relative to a threshold value. For example, an image pixel is determined as a foreground image pixel if the depth value of the image pixel is lower than the threshold value or determined as a background image pixel if the depth value of the image pixel is larger than the threshold value. In another example, an image object is determined as a foreground image object if the average depth value of image pixels in the image object is lower than the threshold value or determined as a background image object if the average depth value of image pixels in the image object is larger than the threshold value. In the above examples, the depth value of an image pixel is defined such that a higher depth value corresponds to an image pixel that is farther away from the surface of the three dimensional space. Alternatively, the definition of the depth value of an image pixel may be inverted such that a lower depth value corresponds to an image pixel that is farther away from the surface of the three dimensional space. Consequently, the classification of an image pixel or an image object into fore/background will be inverted as well.

Figure 2:
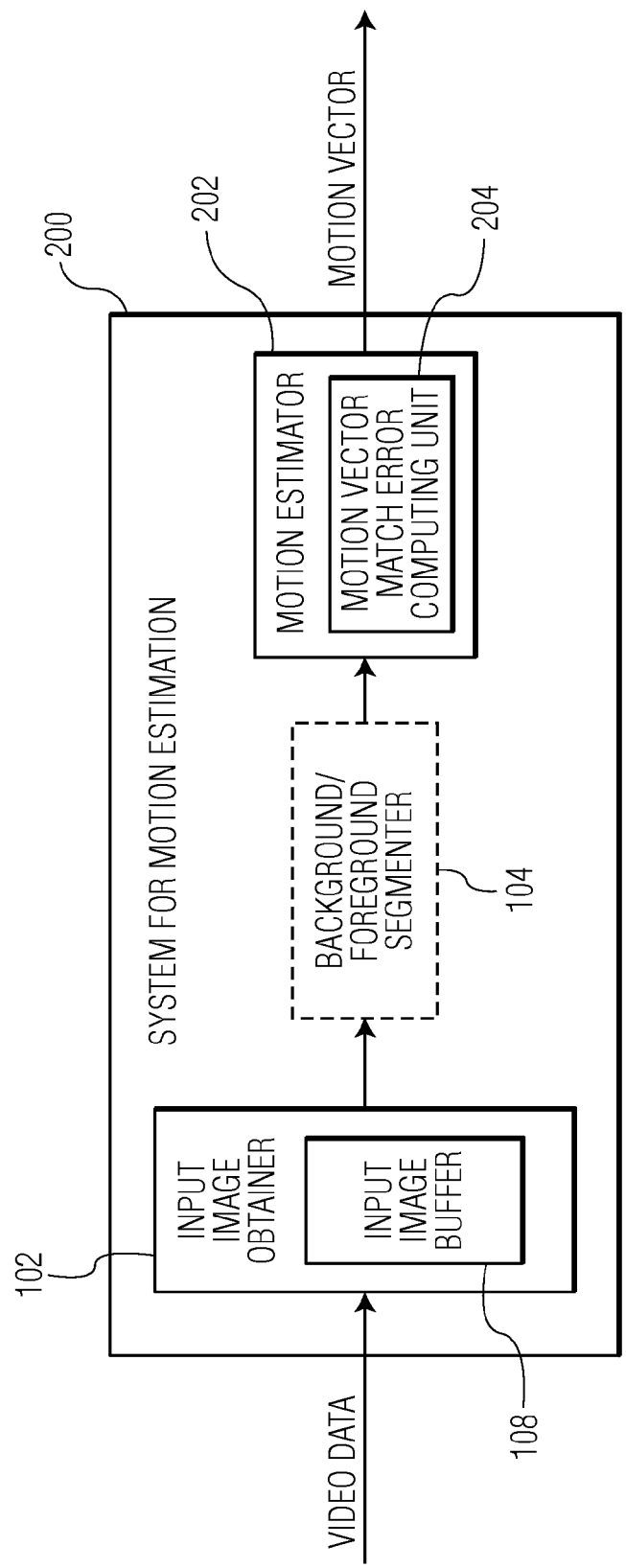
FIG. 2 is a schematic block diagram of a system for motion estimation in accordance with another embodiment of the invention.

FIG. 2 is a schematic block diagram of a system 200 for motion estimation in accordance with another embodiment of the invention. The system for motion estimation in FIG. 2 is similar to the system 100 for motion estimation in FIG. 1A except that the motion estimator 202 in FIG. 2 includes a motion vector match error computing unit 204. In the embodiment of FIG. 2, the motion estimator generates a motion vector for a group of image pixels in the input image frame and obtains a corresponding group of image pixels in at least one other input image frame using the motion vector. The motion vector match error computing unit is configured to calculate a match error between the group of image pixels in the input image frame and the corresponding group of image pixels in the other input image frame using the depth information from the input image frame and the other input image frame. The motion vector match error computing unit may calculate the match error solely using the depth information or calculate the match error using the depth information and other image information such as luminance and/or chrominance information. The motion vector match error computing unit can improve the motion estimation quality in occlusion areas and improve the overall quality such as peak signal-to-noise ratio (PSNR) and smoothness of the motion estimator in the remaining image areas.

Figure 3:
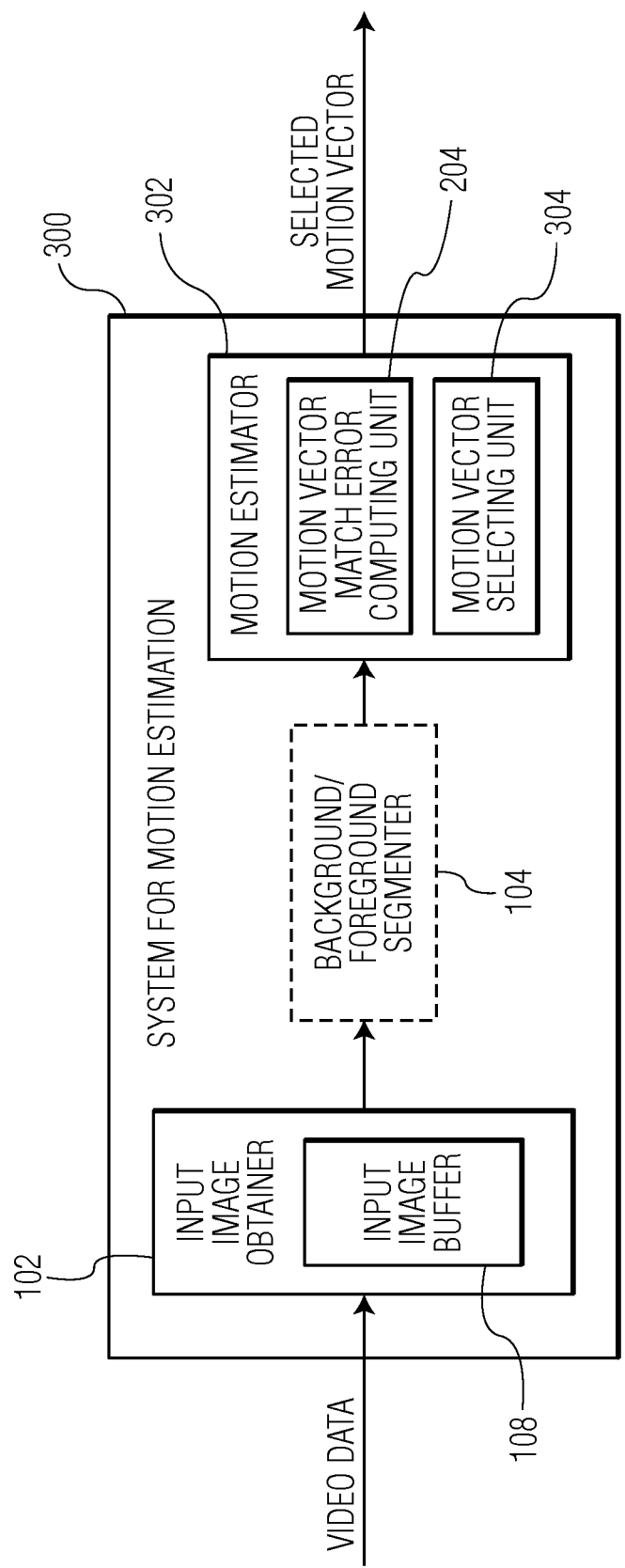
FIG. 3 is a schematic block diagram of a system for motion estimation in accordance with another embodiment of the invention.

FIG. 3 is a schematic block diagram of a system 300 for motion estimation in accordance with another embodiment of the invention. The system for motion estimation in FIG. 3 is similar to the systems 100, 200 for motion estimation in FIGS. 1A and 2 except that the motion estimator 302 in FIG. 3 includes a motion vector selecting unit 304. In the embodiment of FIG. 3, the motion estimator generates candidate motion vectors for a group of image pixels in an input image frame. For example, the motion vectors are generated through a three-frame motion estimation. In other words, the motion vectors are generated using three input image frames. For each motion vector of the candidate motion vectors, the motion estimator obtains a corresponding group of image pixels in at least one other input image frame using the motion vector. The motion vector match error computing unit 204 in FIG. 3 calculates a match error between the group of image pixels in the input image frame and the corresponding group of image pixels in the other input image frame using the depth information from the input image frame and the other input image frame. The motion vector selecting unit is configured to select a motion vector from the motion vectors using the calculated match errors. In an embodiment, the motion vector match error computing unit calculates a depth difference between the group of image pixels in the input image frame and the corresponding group of image pixels in the other input image frame and the motion vector selecting unit selects a motion vector that achieves the largest depth difference among the motion vectors.

Figure 4:
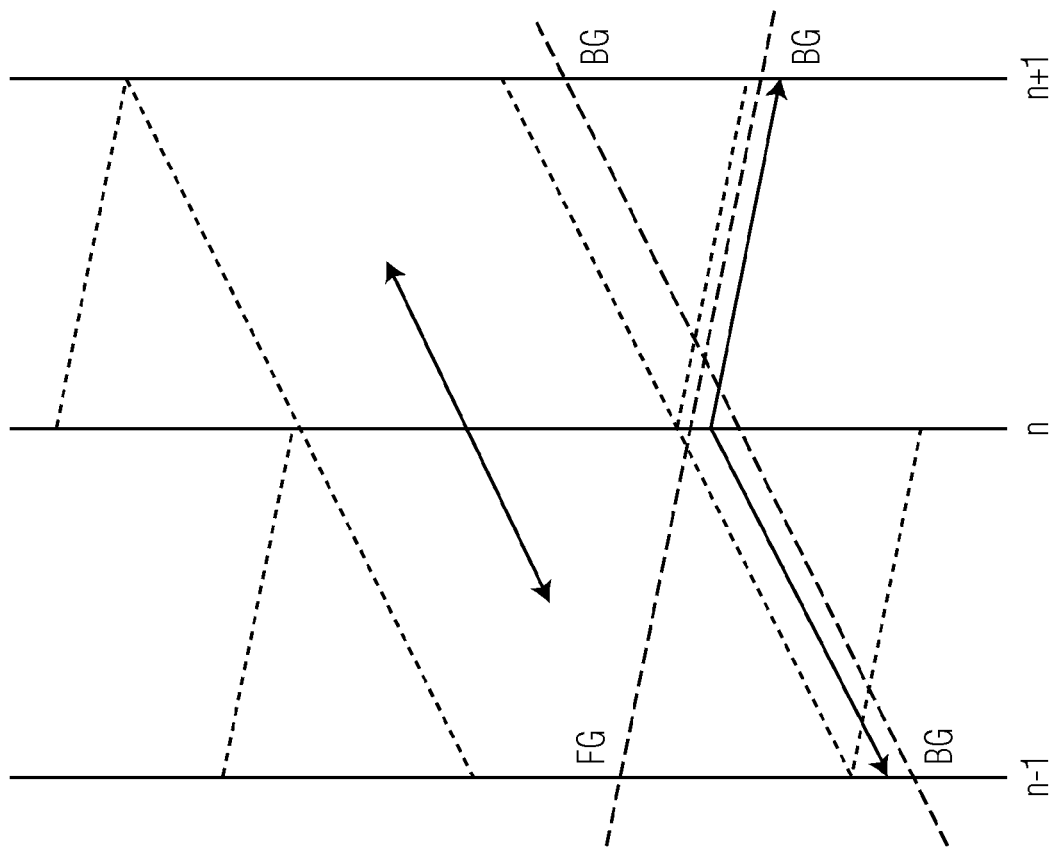
FIG. 4 depicts exemplary three-frame motion estimations that can be performed by the system for motion estimation in FIG. 3.

FIG. 4 depicts exemplary three-frame motion estimations that can be performed by the system 300 for motion estimation in FIG. 3. Although performing motion estimation using two input image frames is a more common and memory-conservative approach, a three-frame motion estimation in which motion vectors are generated using three input image frames can reduce the visibility of halo artifacts due to occlusion. For example, the three-frame motion estimation can combine forward motion vectors and backward motion vectors to form occlusion-free motion vectors. Due to noise and/or repetitive structures, the motion vectors that result from motion vector selection based on the comparison of match errors caused by image information such as luminance and/or chrominance information continue to suffer from occlusion problems in certain areas. Motion vector selection using the depth information from the input image frames can improve occlusion performance of the selected motion vector in the presence of noise and/or repetitive structures. As depicted in FIG. 4, the motion estimator 302 in FIG. 3 performs motion estimation on three input image frames, sequence numbered "n−1," "n," and "n+1," respectively, to generate motion vectors. In occlusion areas, a correctly estimated motion vector points to the background along the original vector direction and to the foreground (FG) in the reversed vector direction and an erroneously estimated vector points to the background (BG) both in the original vector direction and in the reversed vector direction. Based on the above observations, the system for motion estimation in FIG. 3 performs the motion vector selection using the depth information. The system for motion estimation in FIG. 3 may perform the motion vector selection directly using the depth information. For example, the motion vector match error computing unit 204 calculates the differences in depth along the forward and backward directions between a group of image pixels in the input image frame "n−1" and corresponding groups of image pixels in other input image frames "n" and "n+1" and the motion vector selecting unit 304 selects the motion vector that achieves the highest depth difference among the motion vectors. Alternatively, the system for motion estimation in FIG. 3 may perform the motion vector selection indirectly using the depth information. For example, the system for motion estimation in FIG. 3 uses a background/foreground segmentation map, which is generated by the background/foreground segmenter 104, to identify a pixel that is pointed at by a motion vector as a foreground image pixel or a background image pixel. In an exemplary operation, the background/foreground segmenter performs segmentation of an background and an foreground of the input image frames "n−1," "n," and "n+1" using depth information from the input image frames and the motion estimator determines whether a group of image pixels in the input image frame "n−1" is background image pixels and whether corresponding groups of image pixels in the input image frames "n" and "n+1" are foreground image pixels.

Figure 5:
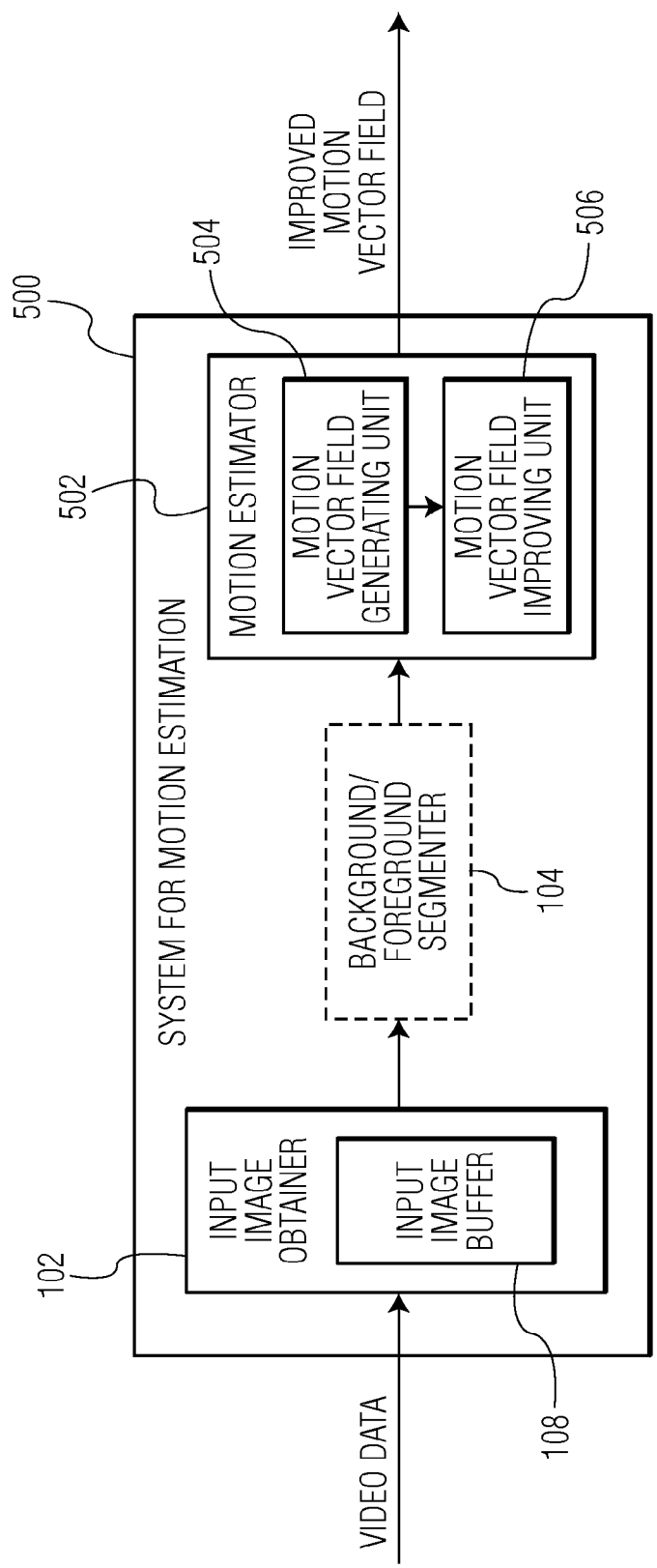
FIG. 5 is a schematic block diagram of a system for motion estimation in accordance with another embodiment of the invention.

FIG. 5 is a schematic block diagram of a system 500 for motion estimation in accordance with another embodiment of the invention. The system for motion estimation in FIG. 5 is similar to the system 100 for motion estimation in FIG. 1A except that the motion estimator 502 in FIG. 5 includes a motion vector field generating unit 504 and a motion vector field improving unit 506. In the embodiment of FIG. 5, the motion vector field generating unit is configured to generate motion vectors for the input image frames and to produce a motion vector field that includes the motion vectors. The motion vector field improving unit is configured to improve the motion vector field using the depth information from the input image frames. Because of the motion vector field generating unit and the motion vector field improving unit, the system for motion estimation in FIG. 5 can post-process a motion vector field.

Figure 6:
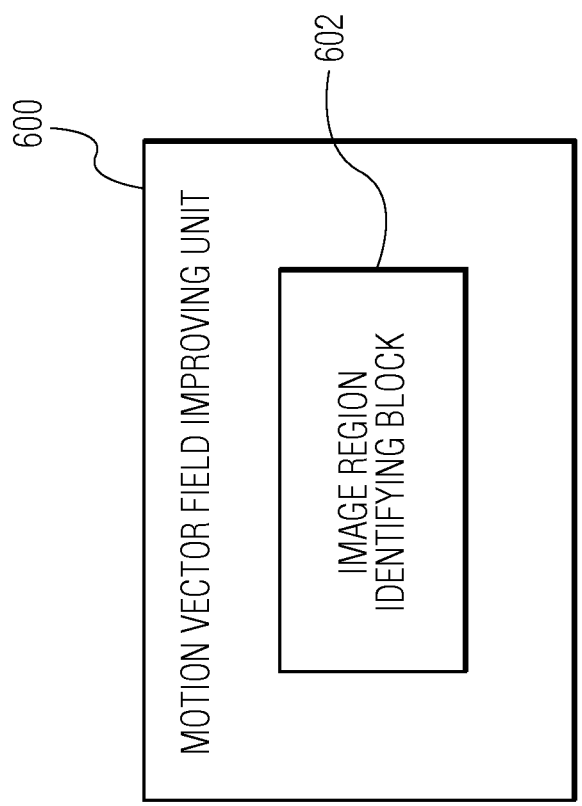
FIG. 6 depicts an embodiment of the motion vector field improving unit in FIG. 5.

FIG. 6 depicts an embodiment of the motion vector field improving unit 506 in FIG. 5. In the embodiment of FIG. 6, the motion vector field improving unit 600 includes an image region identifying block 602. The background/foreground segmenter 104 performs segmentation of a background object and a foreground object of an input image frame using the depth information from the input image frame. The image region identifying block is configured to 1) identify a first region of image pixels in the input image frame, where the first region is inside a border of the foreground object, to 2) identify a second region of image pixels in the input image frame, where the second region is outside the border of the foreground object and in contact with the background object, and to 3) correct the motion vector field using the first region and the second region.

Figure 7:
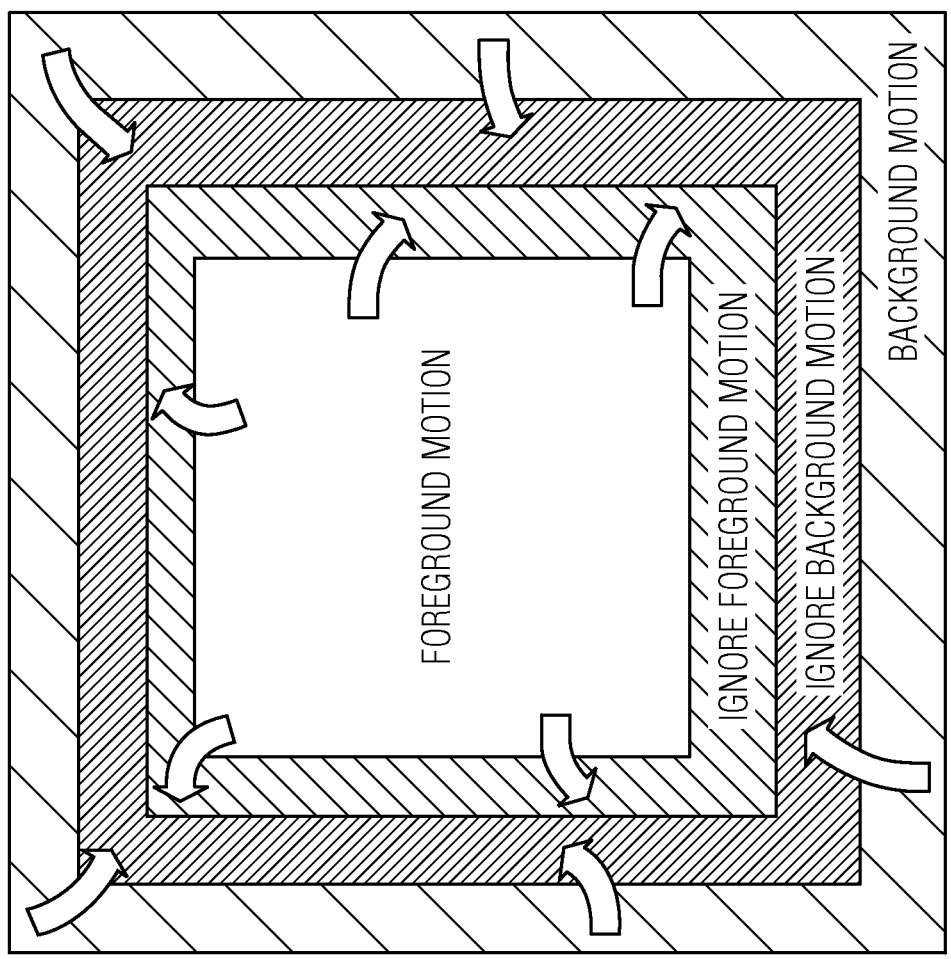
FIG. 7 illustrates an exemplary operation of the system for motion estimation in FIG. 5.

FIG. 7 illustrates an exemplary operation of the system 500 for motion estimation in FIG. 5. As shown in FIG. 7, an image frame includes a foreground object labeled "foreground motion," a background object labeled "background motion," and two intermediate regions labeled "ignore foreground motion" and "ignore background motion," which are identified by the image region identifying block in FIG. 6. In the exemplary operation, the motion vector field that is generated using the foreground object labeled "foreground motion" and the background object labeled "background motion" is corrected at the pixel level using the adjacent neighbor pixels in the two intermediate regions labeled "ignore foreground motion" and "ignore background motion." As a result, objects misalignment in an image frame that is generated using motion estimation can be reduced.

Figure 8:
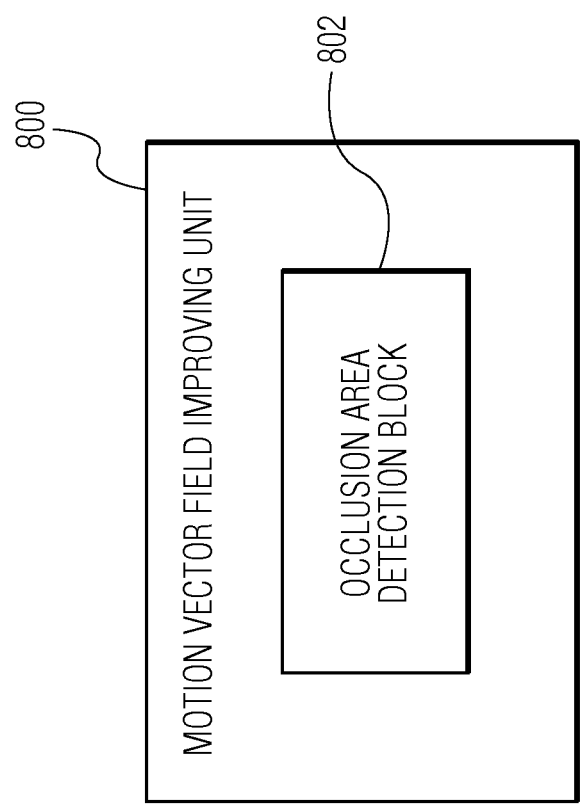
FIG. 8 depicts another embodiment of the motion vector field improving unit in FIG. 5.

FIG. 8 depicts another embodiment of the motion vector field improving unit 506 in FIG. 5. When a motion vector is wrongly estimated due to occlusion, typically the motion vector refers to background motion but is wrongly estimated as referring to foreground motion. It can be difficult to identify whether a motion vector refers to foreground motion or background motion. However, with the depth information from the input image frames, the pixel depth value in the image positions where the motion vector borders an occlusion area is different from each other. As a result, whether a motion vector refers to foreground motion or background motion can be identified. In the embodiment of FIG. 8, the motion vector field improving unit 800 includes an occlusion area detection block 802. The background/foreground segmenter 104 performs segmentation of a background object and a foreground object of an input image frame using the depth information from the input image frame. The occlusion area detection block is configured to identify an occlusion area in the input image frame when the foreground object moves from its position in the input image frame relative to its position in the rest of the input image frames. For example, the occlusion area detection block identifies the occlusion area using a left/right consistency check when the input is stereo or by counting matches. If the number of matches is low or if the match error is high, a checked image area is likely an occlusion area. The motion vector field improving unit identifies depth values of image pixels where a motion vector borders the occlusion area and determines whether the motion vector refers to foreground motion or background motion using the depth values of the image pixels.

Figure 9:
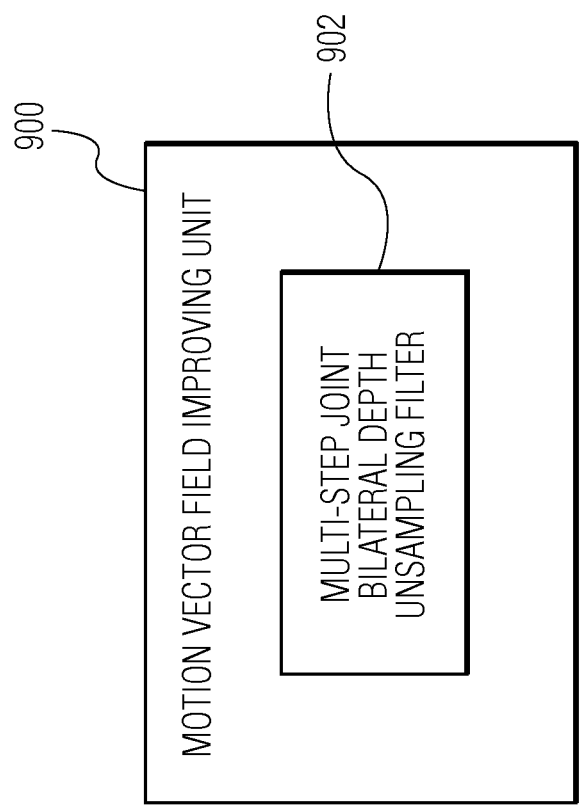
FIG. 9 depicts another embodiment of the motion vector field improving unit in FIG. 5.

FIG. 9 depicts another embodiment of the motion vector field improving unit 506 in FIG. 5. In the embodiment of FIG. 9, the motion vector field improving unit 900 includes a multi-step joint bilateral depth upsampling filter 902. The multi-step joint bilateral depth upsampling filter is configured to erode the motion vector field using the depth information from the input image frames or on the background/foreground segmentation information, which is generated by the background/foreground segmenter 104 in FIG. 5. When the aperture of the multi-step joint bilateral depth upsampling filter is significantly larger than the size of the occlusion area, the motion vector field can be properly aligned with image depth boundaries at the pixel level.

Figure 10:
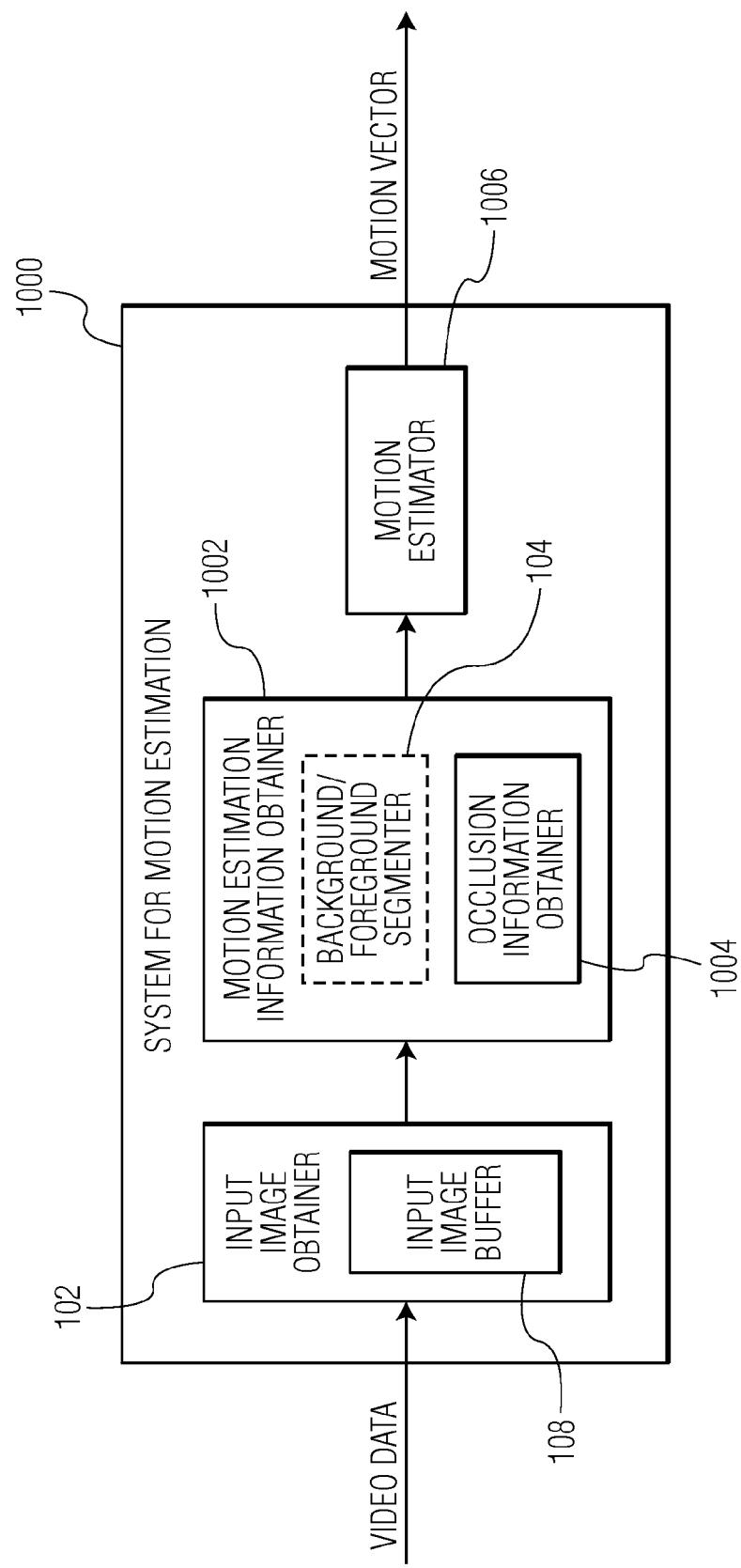
FIG. 10 is a schematic block diagram of a system for motion estimation in accordance with another embodiment of the invention.

FIG. 10 is a schematic block diagram of a system 1000 for motion estimation in accordance with another embodiment of the invention. The system for motion estimation in FIG. 10 is similar to the system 100 for motion estimation in FIG. 1A except that the system in FIG. 10 includes a motion estimation information obtainer 1002, which includes the optional background/foreground segmenter 104 and an occlusion information obtainer 1004. In the embodiment of FIG. 10, the occlusion information obtainer is configured to generate occlusion information of the input image frames using the depth information from the input image frames, where the occlusion information of the input image frames indicates whether a foreground object moves from its position in the input image frame relative to its position in the rest of the input image frames. Given reliable depth information, the occlusion information of an input image frame may be available, desirable or otherwise easily computable. The motion estimator 1006 in FIG. 10 performs motion estimation on input image frames using depth information and the occlusion information.

Figure 11:
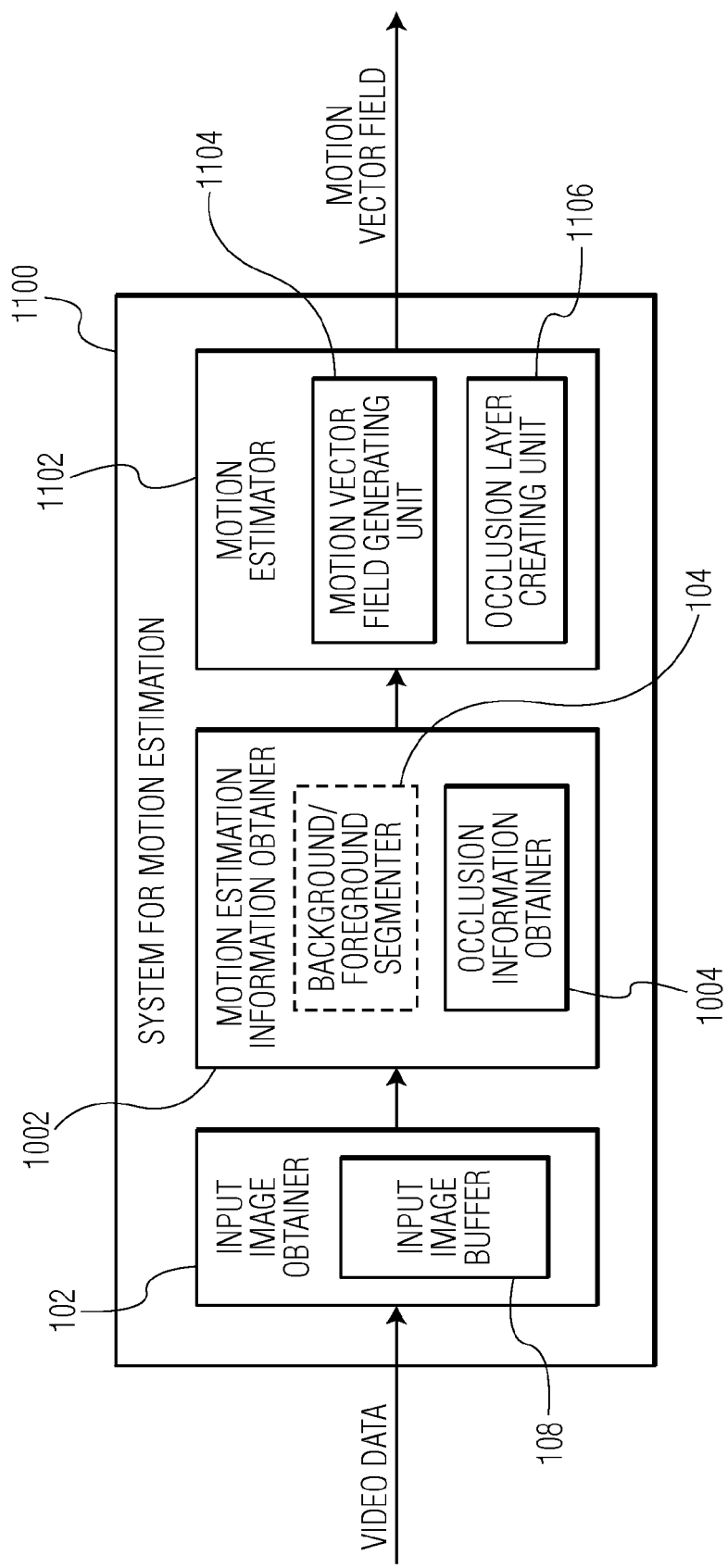
FIG. 11 is a schematic block diagram of a system for motion estimation in accordance with another embodiment of the invention.

FIG. 11 is a schematic block diagram of a system 1100 for motion estimation in accordance with another embodiment of the invention. The system for motion estimation in FIG. 11 is similar to the system 1000 for motion estimation in FIG. 10 except that the motion estimator 1102 in FIG. 11 includes a motion vector field generating unit 1104 and an occlusion layer creating unit 1106. In the embodiment of FIG. 11, the background/foreground segmenter 104 performs segmentation of a background object and a foreground object of an input image frame using the depth information from the input image frame and the occlusion layer creating unit creates a new image frame that includes an occlusion layer when the foreground object moves from its position in the input image frame relative to its position in the rest of the input image frames, where the occlusion layer only includes the background object of the input image frame. The motion estimator performs motion estimation on the input image frames and the new input image frame and the motion vector field generating unit generates motion vectors for the input image frames and produces a motion vector field that includes the motion vectors. By providing an occlusion layer and performing motion estimation using the occlusion layer, the generated motion vector field refers to the background motion and is occlusion-free. In an embodiment, motion estimation using the new image frame that includes the occlusion layer is performed only in the occlusion or de-occlusion regions of an input image frame.

Figure 12:
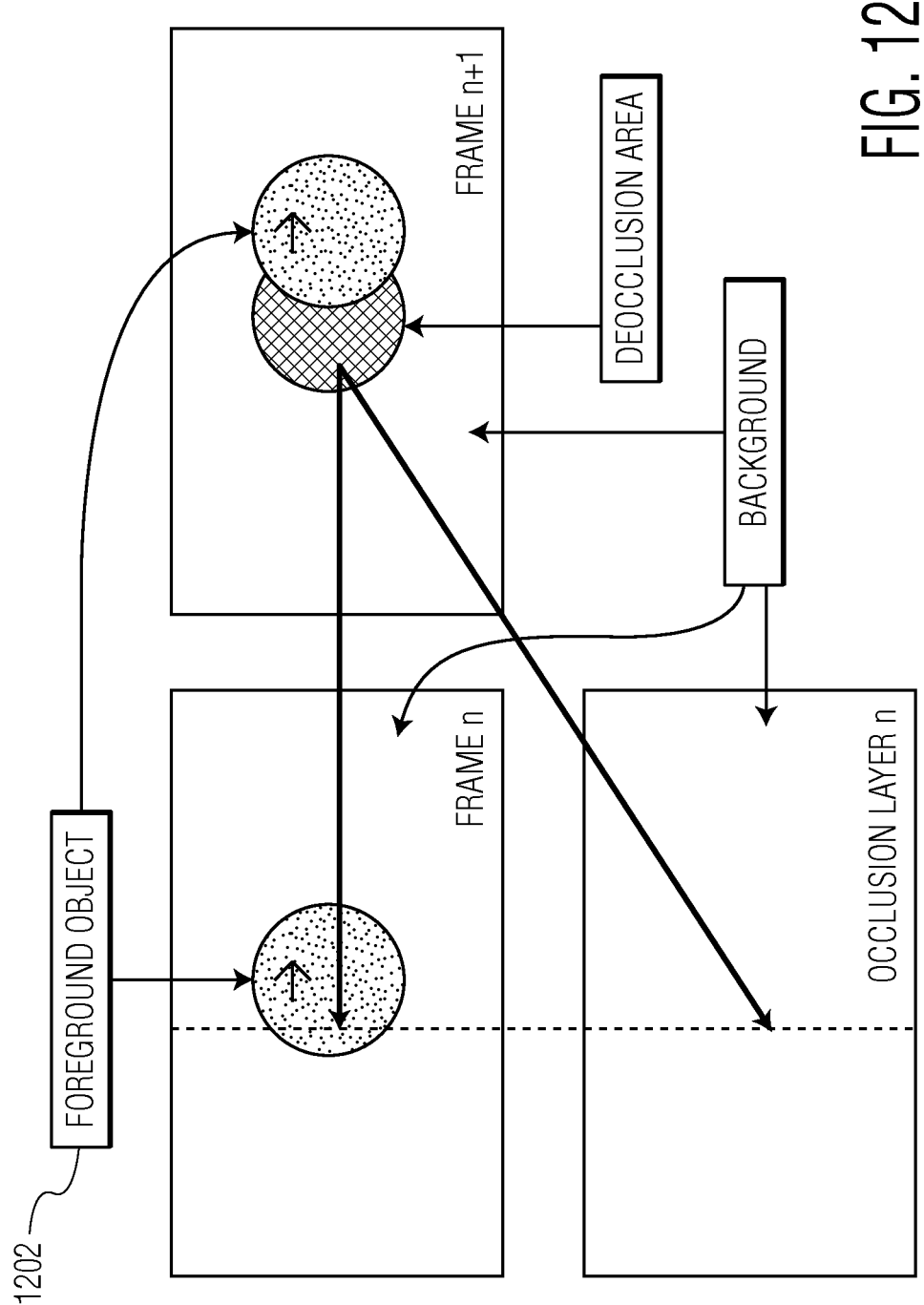
FIG. 12 depicts an exemplary operation of the system for motion estimation in FIG. 11.

FIG. 12 depicts an exemplary operation of the system 1100 for motion estimation in FIG. 11. As shown in FIG. 12, a foreground object 1202 moves from its position in an input image frame "n" relative to its position in another input image frame "n+1." As a result, some image pixels in the input image frame "n+1" that were previously covered by the foreground object are now uncovered and some other image pixels in the input image frame "n+1" that were previously uncovered are now covered by the foreground object. A new frame "occlusion layer n," which is created by the occlusion layer creating unit, only includes an background of the input image frames "n" and "n+1." Motion estimation is performed on the two input image frame "n" and "n+1," and the new frame "occlusion layer n."

Figure 13:
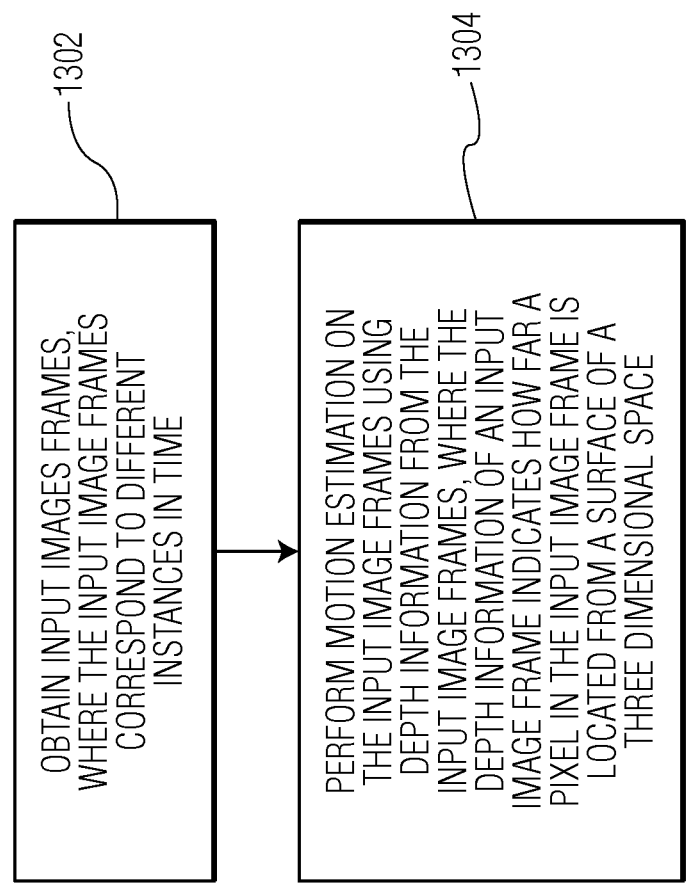
FIG. 13 is a process flow diagram of a method for motion estimation in accordance with an embodiment of the invention.

FIG. 13 is a process flow diagram of a method for motion estimation in accordance with an embodiment of the invention. At block 1302, input image frames are obtained, where the input image frames correspond to different instances in time. At block 1304, motion estimation is performed on the input image frames using depth information from the input image frames, where the depth information from an input image frame indicates how far a pixel in the input image frame is located from a surface of a three dimensional space.

The various components or units of the embodiments that have been described or depicted may be implemented in software that is stored in a computer readable medium, hardware, or a combination of software that is stored in a computer readable medium and hardware.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention that have been described or depicted include several components described or depicted herein, other embodiments of the invention may include fewer or more components to implement less or more functionality.

Although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for motion estimation, the method comprising:
   obtaining input image frames, wherein the input image frames correspond to different instances in time; and
   performing motion estimation on the input image frames using depth information from the input image frames, wherein the depth information from an input image frame indicates how far a pixel in the input image frame is located from a surface of a three dimensional space, wherein performing the motion estimation comprises:
   generating a motion vector for a group of image pixels in the input image frame;
   obtaining a corresponding group of image pixels in another input image frame of the input image frames using the motion vector; and
   calculating a match error between the group of image pixels in the input image frame and the corresponding group of image pixels in the another input image frame using the depth information from the input image frame and the another input image frame.

2. The method of claim 1, wherein the depth information from the input image frame comprises depth values that correspond to two objects in the input image frame, and wherein the depth values indicate which one of the two objects is located in a foreground of the three dimensional space and which one of the two objects is located in a background of the three dimensional space.

3. The method of claim 1, wherein the depth information from the input image frame comprises depth values, and wherein each image pixel in the input image frame has one depth value.

4. The method of claim 1, wherein the depth information from the input image frame comprises depth values, and wherein a group of image pixels in the input image frame has one depth value.

5. The method of claim 1, wherein performing the motion estimation comprises:
   generating motion vectors for the input image frames and producing a motion vector field that includes the motion vectors; and
   improving the motion vector field using the depth information from the input image frames.

6. The method of claim 5 further comprising performing segmentation of a background object and a foreground object of the input image frame using the depth information from the input image frame, wherein improving the motion vector field comprises:
   identifying a first region of image pixels in the input image frame, wherein the first region is inside a border of the foreground object;
   identifying a second region of image pixels in the input image frame, wherein the second region is outside the border of the foreground object and in contact with the background object; and
   correcting the motion vector field using the first region of image pixels and the second region of pixels.

7. The method of claim 5 further comprising:
   performing segmentation of a background object and a foreground object of the input image frame using the depth information from the input image frame; and
   identifying an occlusion area in the input image frame when the foreground object moves from the input image frame to the rest of the input image frames;
   wherein improving the motion vector field comprises:
   identifying depth values of image pixels in an image frame area where a motion vector borders the occlusion area; and
   determining whether the motion vector refers to foreground motion or background motion using the depth values of the image pixels.

8. The method of claim 1, wherein performing the motion estimation comprises:
   generating motion vectors for a group of image pixels in the input image frame;
   for each motion vector of the motion vectors, obtaining a corresponding group of image pixels in another input image frame of the input image frames using the motion vector and calculating a match error between the group of image pixels in the input image frame and the corresponding group of image pixels in the another input image frame using the depth information from the input image frame and the another input image frame; and
   selecting a motion vector from the motion vectors using the calculated match errors.

9. The method of claim 8, wherein calculating the match error comprises calculating a depth difference between the group of image pixels in the input image frame and the corresponding group of image pixels in the another input image frame, wherein selecting the motion vector comprises selecting a motion vector that achieves the largest depth difference among the motion vectors.

10. The method of claim 9, wherein generating the motion vectors comprises generating the motion vectors using three input image frames.

11. The method of claim 1 further comprising performing segmentation of a background and a foreground of the input image frame using the depth information from the input image frame, wherein performing the segmentation comprises:
- calculating a depth value change between a current depth value of an image pixel in the input image frame and a previous depth value of the image pixel in the input image frame; and
- determining the image pixel as a background image pixel or a foreground image pixel using the depth value change.

12. The method of claim 11, wherein performing the motion estimation comprises:
- generating motion vectors for a group of image pixels in the input image frame;
- obtaining a corresponding group of image pixels in another input image frame of the input image frames using a motion vector of the motion vectors; and
- determining whether the group of image pixels in the input image frame are background image pixels and whether the corresponding group of image pixels in the another input image frame are foreground image pixels.

13. The method of claim 1 further comprising generating occlusion information of the input image frames using the depth information from the input image frames, wherein the occlusion information of the input image frames indicates whether a foreground object moves from the input image frame to the rest of the input image frames, and wherein performing the motion estimation comprises performing motion estimation on the input image frames using the depth information from the input image frames and the occlusion information of the input image frames.

14. The method of claim 1 further comprising:
- performing segmentation of a background object and a foreground object of the input image frame using the depth information from the input image frame; and
- creating a new image frame that includes an occlusion layer when the foreground object moves from the input image frame to the rest of the input image frames, wherein the occlusion layer only includes the background object of the input image frame.

15. The method of claim 14, wherein performing the motion estimation comprises:
- performing motion estimation on the input image frames and the new input image frame; and
- generating motion vectors for the input image frames and producing a motion vector field that includes the motion vectors.

16. A method for motion estimation, the method comprising:
- obtaining input image frames, wherein the input image frames correspond to different instances in time; and
- performing motion estimation on the input image frames using depth information from the input image frames, wherein the depth information from an input image frame indicates how far a pixel in the input image frame is located from a surface of a three dimensional space, wherein the depth information from the input image frame comprises depth values, wherein each image pixel in the input image frame has one depth value or a group of image pixels in the input image frame has one depth value, and wherein performing the motion estimation comprises:
  - generating a motion vector for a group of image pixels in the input image frame;
  - obtaining a corresponding group of image pixels in another input image frame of the input image frames using the motion vector; and
  - calculating a match error between the group of image pixels in the input image frame and the corresponding group of image pixels in the another input image frame using the depth information from the input image frame and the another input image frame.

17. The method of claim 16, wherein performing the motion estimation comprises:
- generating motion vectors for the input image frames and producing a motion vector field that includes the motion vectors; and
- improving the motion vector field using the depth information from the input image frames.

18. A system for motion estimation, the system comprising:
- an input image obtainer configured to obtain input image frames, wherein the input image frames correspond to different instances in time; and
- a motion estimator configured to perform motion estimation on the input image frames using depth information from the input image frames, wherein the depth information from an input image frame indicates how far a pixel in the input image frame is located from a surface of a three dimensional space, wherein the motion estimator is further configured to:
- generate a motion vector for a group of image pixels in the input image frame;
- obtain a corresponding group of image pixels in another input image frame of the input image frames using the motion vector; and
- calculate a match error between the group of image pixels in the input image frame and the corresponding group of image pixels in the another input image frame using the depth information from the input image frame and the another input image frame.

19. The system of claim 18, wherein the motion estimator comprises:
- a motion vector field generating unit configured to generate motion vectors for the input image frames and to produce a motion vector field that includes the motion vectors; and
- a motion vector field improving unit configured to improve the motion vector field using the depth information from the input image frames.

20. A method for motion estimation, the method comprising:
- obtaining input image frames, wherein the input image frames correspond to different instances in time; and
- performing motion estimation on the input image frames using depth information from the input image frames, wherein the depth information from an input image frame indicates how far a pixel in the input image frame is located from a surface of a three dimensional space, wherein performing the motion estimation comprises:
  - generating motion vectors for the input image frames and producing a motion vector field that includes the motion vectors; and
  - improving the motion vector field using the depth information from the input image frames,
- the method further comprising performing segmentation of a background object and a foreground object of the input image frame using the depth information from the input image frame, wherein improving the motion vector field comprises:

identifying a first region of image pixels in the input image frame, wherein the first region is inside a border of the foreground object;

identifying a second region of image pixels in the input image frame, wherein the second region is outside the border of the foreground object and in contact with the background object; and correcting the motion vector field using the first region of image pixels and the second region of pixels.

21. A method for motion estimation, the method comprising:

obtaining input image frames, wherein the input image frames correspond to different instances in time; and performing motion estimation on the input image frames using depth information from the input image frames, wherein the depth information from an input image frame indicates how far a pixel in the input image frame is located from a surface of a three dimensional space, wherein performing the motion estimation comprises: generating motion vectors for the input image frames and producing a motion vector field that includes the motion vectors; and improving the motion vector field using the depth information from the input image frames, the method further comprising:

performing segmentation of a background object and a foreground object of the input image frame using the depth information from the input image frame; and identifying an occlusion area in the input image frame when the foreground object moves from the input image frame to the rest of the input image frames;

wherein improving the motion vector field comprises:

identifying depth values of image pixels in an image frame area where a motion vector borders the occlusion area; and determining whether the motion vector refers to foreground motion or background motion using the depth values of the image pixels.

22. A method for motion estimation, the method comprising:

obtaining input image frames, wherein the input image frames correspond to different instances in time;

performing motion estimation on the input image frames using depth information from the input image frames, wherein the depth information from an input image frame indicates how far a pixel in the input image frame is located from a surface of a three dimensional space; and generating occlusion information of the input image frames using the depth information from the input image frames, wherein the occlusion information of the input image frames indicates whether a foreground object moves from the input image frame to the rest of the input image frames, and wherein performing the motion estimation comprises performing motion estimation on the input image frames using the depth information from the input image frames and the occlusion information of the input image frames.

* * * * *